Oct. 4, 1932.   W. EISSNER   1,880,925
PRODUCTION OF COARSE CRYSTALS
Filed Aug. 23, 1928
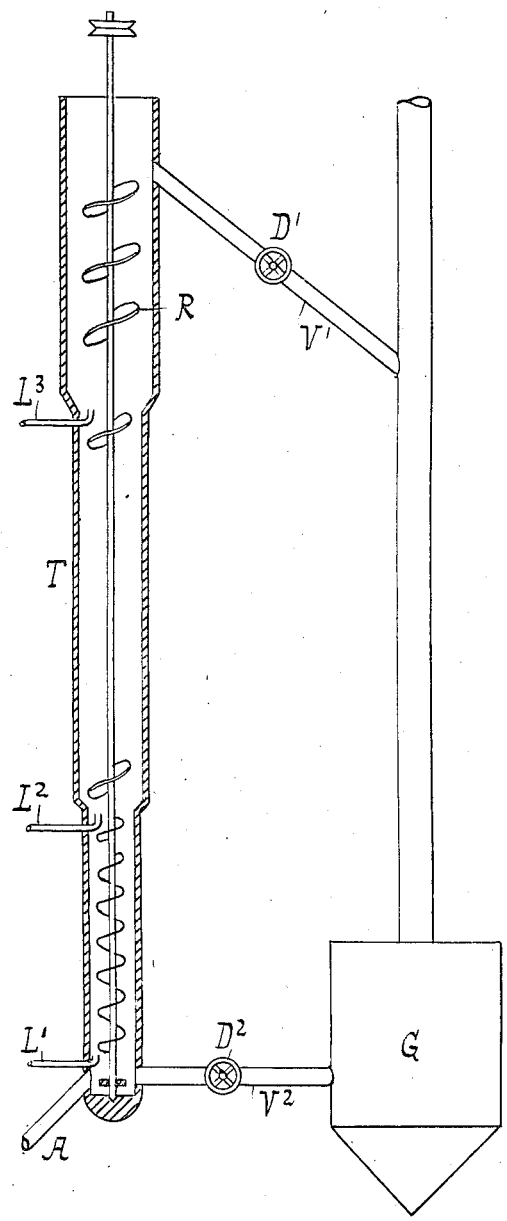
INVENTOR
Willy Eissner
BY
ATTORNEYS Patented Oct. 4, 1932

1,880,925

UNITED STATES PATENT OFFICE

WILLY EISSNER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF COARSE CRYSTALS

Application filed August 23, 1928, Serial No. 301,661, and in Germany August 25, 1927.

In order to obtain crystals of salts, it has already been proposed to pass a previously supercooled solution repeatedly through a bed of small salt crystals, or to allow the latter to drop periodically through a column of saline solution which has been supersaturated by the cooling action of externally or internally disposed cooling surfaces in which case the solution may, at the same time, flow in the opposite direction to that taken by the crystals.

I have now found that crystals of uniform and coarse grain can be recovered from saline solutions by blowing gases or vapors such as air therethrough in such amount that the smaller crystals are kept in suspension and only the coarse crystals of a desired size can fall to the bottom. When working in the said manner, the gas bubbles act as cooling surfaces and at the same time give rise to the formation of crystal nuclei, maintain the growing crystals in suspension, carry away surplus nuclei and maintain the solution in a state of circulation.

A suitable apparatus according to this invention for carrying out the method described is shown in vertical section in the accompanying drawing and comprises a saturator G of any convenient shape for making the saline solution to be treated, which is connected towards its upper and lower ends by means of return and feed tubes $V_1$ and $V_2$ respectively with a tower T, the diameter of which increases by stages towards the top. Gas pipes $L_1$, $L_2$ and $L_3$, through which air, for example, is admitted into the solution, are disposed at different levels or points in the tower T, say near the upper and the lower end and centrally but their number and disposition may be varied according to requirements. Inside the said tower T a system of spiral blades R may be mounted on a rotatable vertical shaft which serve, in certain cases, to assist the circulation of the solution, the velocity of the latter being regulated by the force of the gas current and also by throttling valves $D_1$ and $D_2$ arranged in the return and feed tubes $V_1$ and $V_2$. The shaft of the series of spiral blades may, for example, be hollow, and may be provided, for example at the lower end, with nozzles through which gases or vapors may also be admitted. A practical manner of disposing the spiral blades consists in leaving free the greater portion of the middle zone in the tower between the upper and central gas pipes $L_3$ and $L_2$ in which zone the growing crystals remain. The circulation may also be assisted by a pump, which may suitably be arranged in the feed tube $V_2$. The method of operating consists in saturating the solution with a saline substance at a certain temperature, in the aforesaid vessel G. The saturated solution then enters the bottom of the tower by the feed tube $V_2$ and is caused to circulate by the air blown therein by the gas pipes, being cooled at the same time and depositing crystals. When the crystals have attained a certain size they are no longer supported by the ascending current of air, and sink down to the bottom. They collect in the lower part of the tower, which is made a suitable shape, such as conical or spherical, and can be drawn off through any convenient tapping device at A at the base of the tower. The smallest crystal nuclei are whirled through the return tube $V_1$ into the heated vessel G, where they redissolve. The precipitated saline substance is replenished in the said vessel as required, either by the addition of solid saline substance or by the introduction of suitably concentrated solutions.

The advantage of the method lies in its great simplicity, excellent working effect and capacity for application to manifold different processes, as also in the small consumption of energy and low running costs. Moreover, any troublesome incrustation of any portion of the apparatus is entirely prevented, since the gas bubbles constitute cooling surfaces on which no permanent deposits can be formed.

A further advantage resides in the fact that the air may be wholly or partially replaced by the introduction of such gases or vapors, such for example as ammonia and carbon dioxid which, at the same time, enable a salt or double salt to be formed directly from their components.

The following examples will further illustrate the nature of this invention but it is not restricted thereto.

Example 1

The aforesaid apparatus is charged to slightly above the upper end of the return tube $V_1$ with a solution of ammonium sulfate, saturated at 90° C., a certain amount of the solid salt being placed in the vessel G. While taking care, by suitable application of heat to the said vessel G, that the liquid enters the tower with a constant temperature of 90° C. through feed tube $V_2$, sufficient air is blown in simultaneously by the lower and middle gas pipes $L_1$ and $L_2$ and also by the upper gas pipe $L_3$ if necessary to cause the solution entering at the feed tube to overflow through the return tube $V_1$, at a temperature of 82° C., back into the aforesaid vessel G. When sufficient numbers of crystal nuclei have been formed, the supply of air and the rate of flow of the solution are regulated once for all, so that the formation of nuclei does not exceed a certain desired limit, or that superfluous nuclei are whirled over into the vessel G and that the crystal nuclei are maintained in suspension in the supersaturated solution, to grow therein. Such of the crystals as are no longer sustained by the air and flow and which collect in the lower part of the tower, are best passed, directly after removal, to a suction filter or a centrifuge in order to free them from residual mother liquor. In this way a more or less rounded crystal grain of very uniform character is obtained, the size ranging up to that of peas, according to circumstances.

Example 2

The aforedescribed apparatus is charged with 16 per cent ammonia water, and the spiral-blade mechanism is set in motion, carbon dioxid being introduced at the same time through the hollow shaft thereof. As soon as the first nuclei of ammonium bicarbonate appear, a suitable amount of ammonia is admitted at the lower gas pipe $L_1$. The requisite temperature of about 40° C. can be maintained by the amount of the gases introduced or also by mixing these gases with air. The action of the spiral-blade mechanism may be replaced by an increased supply of air.

What I claim is:—

1. A process of producing coarsely crystalline salts which consists in cooling a body of a hot saturated solution of a salt and keeping the solution in an upward movement by passing a current of gas through the solution at such a rate that only the coarse crystals can fall to the bottom, so much of a hot saturated solution of the salt being supplied to the lower part of the body of the solution as is carried upward by the gas.

2. A process of producing coarsely crystalline salts which comprises cooling a body of a hot saturated solution of a salt and keeping the solution in an upward movement by passing a current of gas through the solution at such a rate that only the coarse crystals can fall to the bottom and the surplus crystal nuclei are carried away in the solution, so much of a hot saturated solution of the salt being supplied to the lower part of the body of the solution as is carried upward by the gas.

3. A process of producing coarsely crystalline salts which comprises cooling a body of a hot saturated solution of a salt and keeping the solution in an upward movement by passing a current of gas through the solution at such a rate that only the coarse crystals can fall to the bottom and the surplus crystal nuclei are carried away in the solution, the movement of the solution being assisted by mechanical means and so much of a hot saturated solution of the salt being supplied to the lower part of the body of the solution as is carried upward.

4. A process of producing coarsely crystalline salts which comprises cooling a body of a hot saturated solution of a salt and keeping the solution in an upward movement by passing a current of gas through the solution at such a rate that only the coarse crystals can fall to the bottom, heating the effluent solution to the initial temperature, saturating it again with the salt, and reintroducing it into the lower part of the body of the solution.

5. A process of producing coarsely crystalline salts which comprises cooling a body of a hot saturated solution of a salt and keeping the solution in an upward movement by passing a current of a gas mixture at least partially reacting with the salt solution through the solution at such a rate that only the coarse crystals can fall to the bottom, so much of a hot saturated solution of the salt being supplied to the lower part of the body of the solution as is carried upward by the gas.

6. Apparatus for producing coarse crystals from salt solutions comprising a tower the diameter of which increases towards the top, connected at its upper and lower ends by means of pipes to a saturator, pipes for introducing a gas into the tower with openings at different levels of the tower, a rotatable vertical shaft carrying inclined blades mounted inside the tower and means for removing coarse crystals of salts at the bottom of the tower.

7. Process for producing uniform coarse crystals from salt solutions which comprises effecting the process in a cycle by confining a quantity of said solution in a saturated condition in a vertical body, connecting said body of solution in said cycle at its upper and lower ends, forcing a gas into said body of solution to cool the same, and inaugurate crystallization, said gas being introduced into said body at such a point and at such a velocity as to cause the solution forming said body to move upward and around said cycle, whereby only coarse crystals fall to the bottom of said body.

8. Process for producing uniform coarse crystals from salt solutions which comprises effecting the process in a cycle by confining a quantity of said solution in a saturated condition in a vertical body, connecting said body of solution in said cycle at its upper and lower ends, forcing a gas into said body of solution to cool the same, and inaugurate crystallization, said gas being introduced into said body at such a point and at such a velocity as to cause the solution forming said body to move upward and around said cycle, whereby only coarse crystals fall to the bottom of said body, drawing off said coarse crystals and resaturating the solution flowing from the upper end of said body at a point in said cycle prior to the reintroduction of said solution into the lower end of said body.

9. Process for producing uniform coarse crystals from salt solutions which comprises effecting the process in a cycle by confining a quantity of said solution in a saturated condition in a vertical body having a circular cross section of different diameters at various elevations forming a plurality of zones, introducing a gas into said body of solution adjacent the lower end of each zone to cool the solution and inaugurate crystallization, said gas being introduced into said body at such a velocity as to cause the solution forming said body to move upward and around said cycle, whereby only coarse crystals fall to the bottom of said body.

10. A process as defined in claim 9 wherein the solution in the uppermost and lowermost zones is agitated during the introduction of said gas.

In testimony whereof I have hereunto set my hand.

WILLY EISSNER.